(12) United States Patent
Bloome et al.

(10) Patent No.: US 10,906,291 B2
(45) Date of Patent: Feb. 2, 2021

(54) CONTROLLABLE RELEASE BUILD PLATE FOR 3D PRINTER

(71) Applicant: Autodesk, Inc., San Rafael, CA (US)

(72) Inventors: Cory Mark Bloome, San Francisco, CA (US); James Sherwood Page, Berkeley, CA (US); Michael Anthony Crockett, Berkeley, CA (US); Gregory Daniel Friedland, San Francisco, CA (US); Andreas Linas Bastian, Berkeley, CA (US)

(73) Assignee: Autodesk, Inc., San Rafael, CA (US)

( * ) Notice: Subject to any disclaimer, the term of this patent is extended or adjusted under 35 U.S.C. 154(b) by 436 days.

(21) Appl. No.: 15/338,068

(22) Filed: Oct. 28, 2016

(65) Prior Publication Data
US 2017/0190120 A1   Jul. 6, 2017

Related U.S. Application Data

(60) Provisional application No. 62/275,706, filed on Jan. 6, 2016.

(51) Int. Cl.
| | |
|---|---|
| *B33Y 50/02* | (2015.01) |
| *B33Y 30/00* | (2015.01) |
| *B29C 64/295* | (2017.01) |
| *B29C 64/245* | (2017.01) |
| *B29C 64/118* | (2017.01) |

(52) U.S. Cl.
CPC ............ *B33Y 50/02* (2014.12); *B29C 64/118* (2017.08); *B29C 64/245* (2017.08); *B29C 64/295* (2017.08); *B33Y 30/00* (2014.12)

(58) Field of Classification Search
CPC ....... B33Y 50/02; B33Y 30/00; B29C 64/245; B29C 64/295; B29C 64/118
See application file for complete search history.

(56) References Cited

U.S. PATENT DOCUMENTS

| | | |
|---|---|---|
| 9,533,449 B2 | 1/2017 | Page |
| 9,669,586 B2 | 6/2017 | Page |
| 9,796,140 B2 | 10/2017 | Page |
| 9,895,841 B2 | 2/2018 | Page |

(Continued)

OTHER PUBLICATIONS

Unknown author, "Heated Bed," (Oct. 24, 2016) [online] (retrieved from http://reprap.org/wiki/Heated_Bed#Introduction), 12 pages.

*Primary Examiner* — Michael M. Robinson
(74) *Attorney, Agent, or Firm* — Fish & Richardson P.C.

(57) ABSTRACT

A fused filament fabrication three dimensional printing system includes a build platform, an extruder for one or more deposition materials, the extruder including at least one nozzle movable relative to the build platform, and a controller configured to control the relative movement between the build platform and the nozzle, and to cause material to be extruded out of the nozzle to form a 3D object on the build platform. The build platform includes a first plate on which the 3D object is formed, a second plate that is positioned vertically below the first plate and defines at least one gap between the first and second plates, and a heating element that is configured to heat the second plate. The first plate defines at least one opening that is configured to allow passage of material extruded from the nozzle into the at least one gap between the first and second plates.

11 Claims, 10 Drawing Sheets

(56) References Cited

U.S. PATENT DOCUMENTS

| | | | |
|---|---|---|---|
| 10,005,126 B2 | 6/2018 | Page | |
| 10,076,880 B2 | 9/2018 | Page | |
| 2014/0371895 A1* | 12/2014 | Sadusk | B33Y 10/00 |
| | | | 700/98 |
| 2015/0093283 A1* | 4/2015 | Miller | A61F 2/3859 |
| | | | 419/55 |
| 2015/0266235 A1 | 9/2015 | Page | |
| 2016/0122541 A1* | 5/2016 | Jaker | C08L 81/06 |
| | | | 264/219 |
| 2016/0332296 A1* | 11/2016 | Kurnianto | B25J 9/02 |
| 2017/0036400 A1* | 2/2017 | Loeffler | B29C 64/20 |
| 2017/0129052 A1* | 5/2017 | Buller | B33Y 30/00 |
| 2018/0015674 A1 | 1/2018 | Page | |
| 2018/0250748 A1 | 9/2018 | Page | |
| 2018/0345376 A1 | 12/2018 | Page | |

\* cited by examiner

CONTROLLABLE RELEASE BUILD PLATE FOR 3D PRINTER

CROSS-REFERENCE TO RELATED APPLICATION

This application claims priority to U.S. Provisional Application No. 62/275,706, filed on Jan. 6, 2016. The disclosure of the prior application is considered part of and is incorporated by reference in the disclosure of this application.

BACKGROUND

This specification relates to a build plate for three dimensional (3D) printers, such as Fused Filament Fabrication (FFF) 3D printers.

3D printers employ additive manufacturing techniques, where a product can be built by the addition of materials. Various types of additive manufacturing techniques can be employed, including granular techniques (e.g., Selective Laser Sintering (SLS) and Direct Metal Laser Sintering (DMLS)) and extrusion techniques (e.g., FFF). In addition, various types of 3D printer structures are employed for 3D printing. For example, FFF 3D printers include both Cartesian (xyz) type 3D printers and delta type 3D printers. In typical Cartesian (xyz) type 3D printers, a carriage for a hot end for an extruder, and/or a build platform, is connected with rails that extend in the three different dimensions of printing (x, y & z). In contrast, in typical delta type 3D printers, a carriage for a hot end for an extruder is connected by arms with three rails that extend in only the z direction, and the carriage is moved in three dimensions by independently adjusting the positions of end points of the arms along the three rails.

SUMMARY

This specification relates to 3D printing or additive manufacturing, such as FFF. According to one aspect, a FFF 3D printing system includes a build platform, an extruder for one or more deposition materials, the extruder including at least one nozzle that is movable relative to the build platform, and a controller configured to control the relative movement between the build platform and the nozzle, and to cause material to be extruded out of the nozzle to form a 3D object on the build platform. The build platform includes a first plate on which the 3D object is formed, second plate that is positioned vertically below the first plate and defines at least one gap between the first and second plates, and a heating element that is configured to heat the second plate. The first plate defines at least one opening that is configured and arranged to allow passage of material extruded from the nozzle into the at least one gap between the first and second plates.

Implementations according to this aspect can include one or more of the following features. For example, the controller can be configured to cause extruded material to flow through one or more of the plurality of openings in the first plate into the gap to thereby form a rivet with a shaft portion that expands within the gap to form a head portion and couple the 3D object on a top surface of the first plate to the head portion of the rivet abutting a bottom surface of the first plate, and to activate the heating element to soften the head portion of the rivet to thereby allow removal of the coupling between the 3D object and the first plate. The controller can be configured to activate the heating element to facilitate softening of the shaft portion and the head portion of the rivet by heating the second plate to above a threshold temperature while the first plate remains below the target threshold temperature. The controller can be configured to activate, during rivet formation, the heating element to heat the second plate to an activation temperature that is below the target threshold temperature to thereby facilitate expansion of the head portion within the gap during rivet formation. In some cases, the heating element can be attached to a bottom surface of the second plate.

In some implementations, a plurality of spacers can be disposed between the first plate and the second plate to maintain the vertical separation between the first and second plates. The plurality of spacers can be made from a thermally insulating material. Additionally, the first plate can be made from a first material and the second plate is made from a second material, the first material having a thermal conductivity that is lower than that of the second material. In some cases, the first plate and the second plate can be made from a same material, the first plate having a shape that leads to lower thermal conductivity compared to the second plate. The second plate can define two or more gaps between the first and second plates, and the at least one opening of the first plate can be configured and arranged to allow passage of material extruded from the nozzle into the two or more gaps. The second plate can define two or more gaps between the first and second plates, and the first plate defines two or more openings that are configured and arranged to allow passage of material extruded from the nozzle into the two or more gaps. In some cases, the two or more gaps defined between the first and second plates may not be in fluidic connection with one another.

According to another aspect, a non-transitory computer-readable medium stores instructions that cause one or more computers to perform operations for controlling a 3D printer, the 3D printer comprising a build platform, the build platform including a first plate on which a 3D object is formed and a second plate that is positioned vertically below and separated from the first plate such that a gap is defined between the first and second plates, and an extruder for one or more deposition materials, the extruder including at least one nozzle that is movable relative to the build platform. The operations include causing at least some of the extruded material to flow through one or more openings that are defined in the first plate into the gap to thereby form a rivet with a head portion that expands within the gap to couple the 3D object to the first plate, causing material to be extruded out of the nozzle while controlling the relative movement between the build platform and the nozzle to thereby form the 3D object above the one or more rivets, and heating the second plate to a threshold temperature to facilitate plastic deformation of the head portion of the rivet to thereby allow removal of the coupling between the 3D object and the first plate.

Implementations according to this aspect can include one or more of the following features. For example, the operations can further include heating, during rivet formation, the second plate to an activation temperature that is lower than the threshold temperature. In some cases, the operations can further include causing material to be extruded out of the nozzle while controlling the relative movement between the build platform and the nozzle to thereby form a raft on which the 3D object is to be built, the raft being attached to the one or more rivets. Forming the rivets can include filling all the openings that are positioned beneath the 3D object to be formed. Additionally, forming the rivets can include filling a select number of the openings that are positioned beneath the 3D object to be formed. Filling the select number of the openings can include filling only the openings that are positioned beneath a perimeter of the 3D object to be formed. In some cases, forming the rivet can include dipping the nozzle into the opening into which the extruded material is to flow. Forming the rivet can further include extruding the material while moving the nozzle out of the opening in a helical path.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
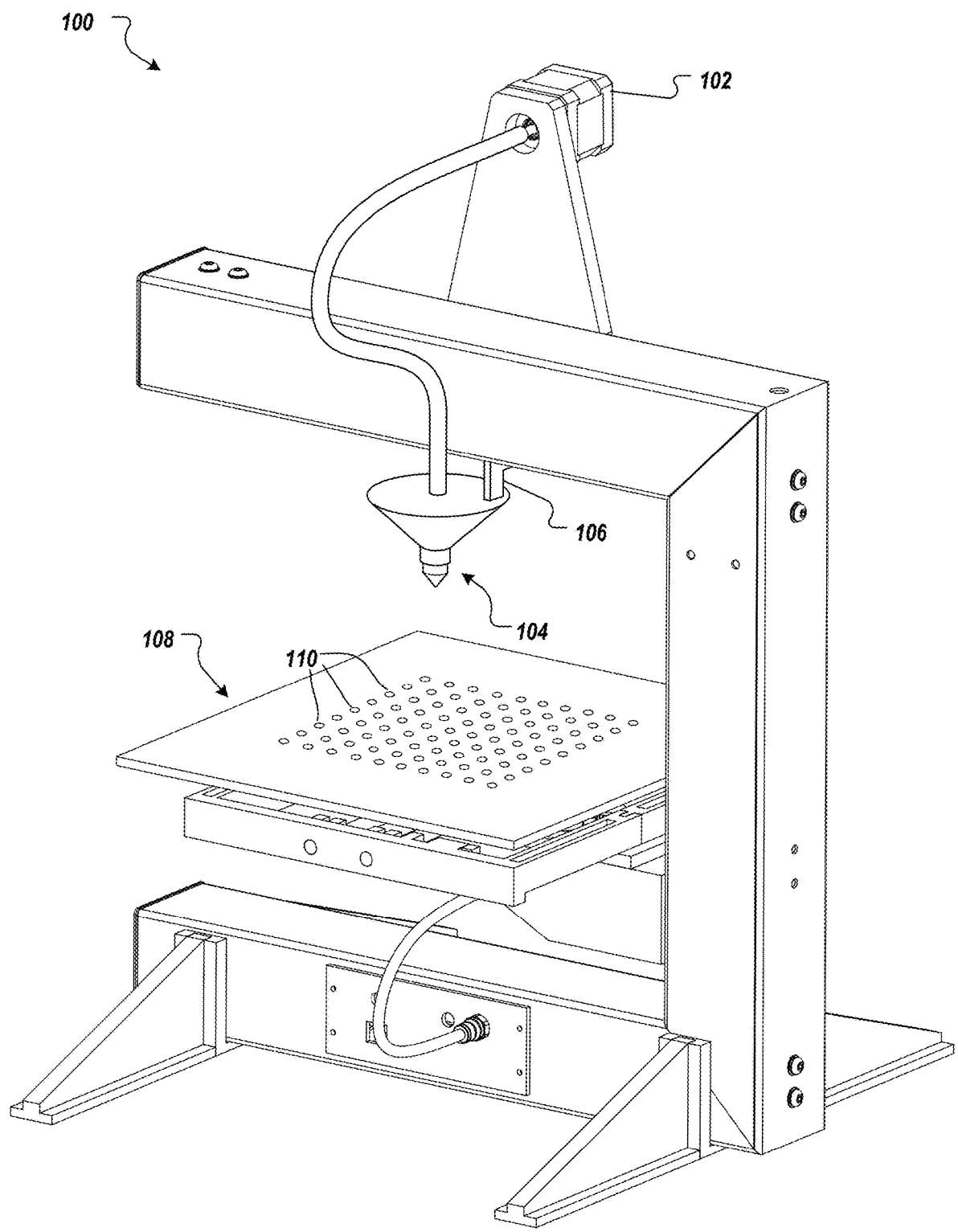
FIG. 1A is an isometric view showing an example of a Cartesian (xyz) type 3D FFF printer.

Referring to FIG. 1A, an example of a Cartesian (xyz) type 3D FFF printer 100 is shown. The 3D printer 100 includes an extruder assembly, which includes an extrusion motor 102 to drive filament to a hot end 104 that connects to a carriage 106. The hot end 104 can include a nozzle having a generally conical shape as shown, but many different types of hot ends with differently shaped nozzles can be used in various implementations. The carriage 106 is moveable in a first direction (x) along a fixed arm of the 3D printer 100, and the additional two directions of movement are achieved by a build platform or plate 108 being moveable in two additional directions (y & z). Furthermore, the build platform or plate 108 includes openings 110, which are described in further detail below.

As will be appreciated, there are many types of motion system structures that can be used to create a Cartesian (xyz) type 3D FFF printer, and the hot end 104 and the build platform 108 can be used with all such variations in the 3D printer, including different systems in which the hot end is not considered part of the extruder. In general, an extruder is a group of parts that handles feeding and extruding the build material. The extruder can be viewed as including two assemblies: (1) a cold end that pulls/feeds the filament (e.g., thermoplastic from a spool), and (2) a hot end, or nozzle, that melts and extrudes the filament (e.g., thermoplastic melted at temperatures of up to 240° C., or in some cases at even higher temperatures). As will be appreciated, the hot end 104 needs to be constructed so as to withstand the high temperatures used to melt the build material. In addition, the hot end 104 needs various systems (e.g., a thermocouple or thermistor, a heater, and an actively controlled fan) to control the temperature of the hot end 104 with precision. As shown in FIG. 1, the hot end 104 has been constructed so as to keep these upstream components within a narrow cone extending from the nozzle tip back upstream (i.e., opposite the filament feed direction). This narrow profile for the hot end 104 can provide significant advantages in operation of a 3D printer.

Figure 1B:
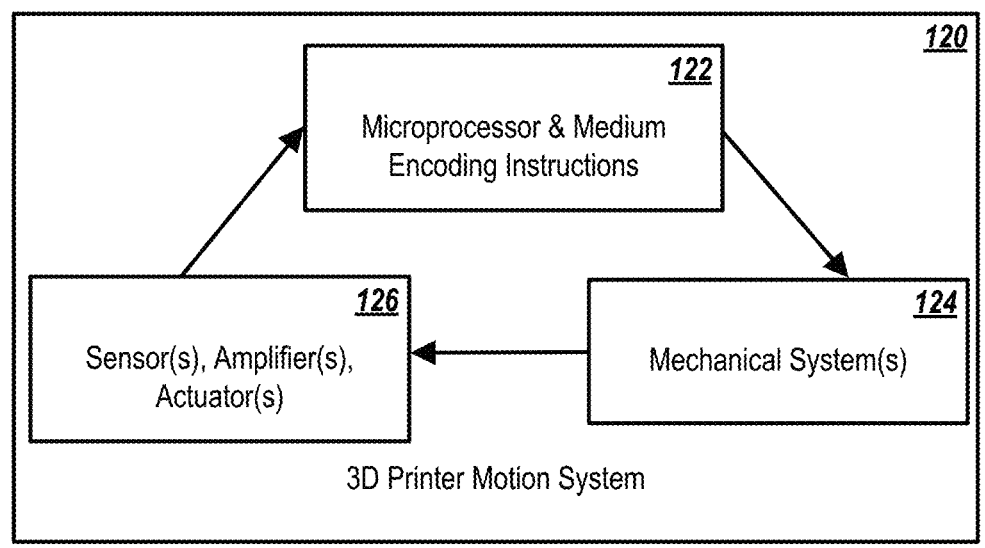
FIG. 1B is a schematic diagram showing an example of a 3D printer motion system.

Referring also to FIG. 1B, the 3D printer 100 can include a 3D printer motion system 120. The 3D printer motion system 120 operates to move the carriage (and thus the hot end) in relation to the 3D build volume. Thus, the 3D printer motion system 120 can include at least one controller and an input/output (I/O) subsystem.

In some implementations, the 3D printer motion system 120 includes at least one processor and medium encoding instruction 122 (e.g., a microprocessor with embedded firmware), one or more mechanical systems 124 (e.g., to physically move the carriage, the build plate, or both), and one or more sensor(s), amplifier(s), and actuator(s) 126. Thus, the 3D printer motion system 120 can be a mechatronic system, which monitors the build environment and/or the 3D printer using sensors, and processes the sensor information in order to change the behavior of the system so as to react to changes in the build environment and/or the 3D printer itself. In this case, the encoded instructions (e.g., software) has become an integral element of the 3D printer, allowing the 3D printer to identify and react to situational changes that can occur during 3D printing.

In some implementations, the 3D printer motion system 120 includes one or more portions of the extruder. For example, the system 120 can include the extrusion motor, filament drive mechanism, or both. In any case, the 3D printer motion system 120 causes movement of the hot end in relation to the build volume, and so these motions are coordinated with the melting and extruding done at the hot end.

Figure 1C:
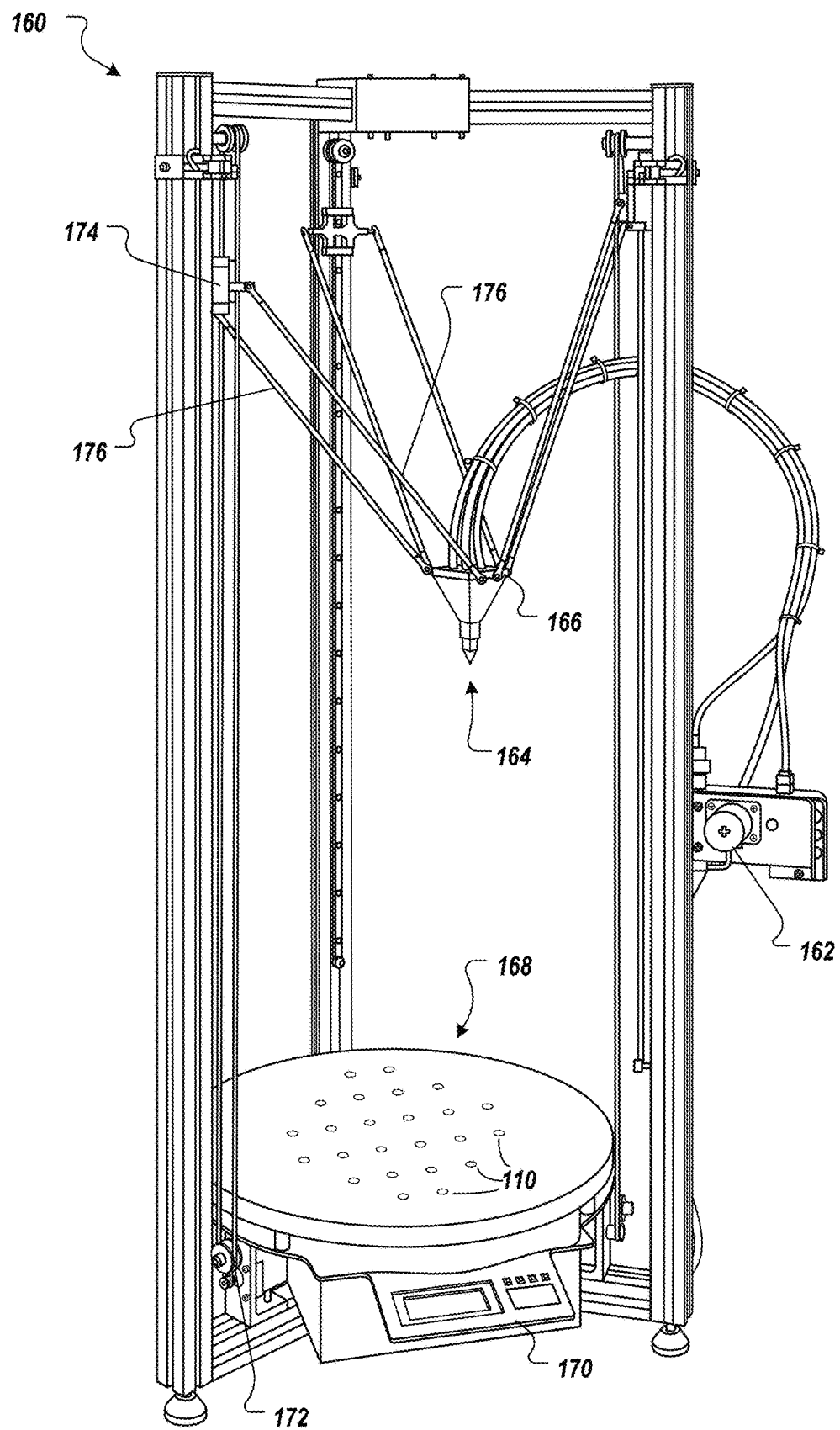
FIG. 1C is an isometric view showing an example of a delta type 3D FFF printer.

FIG. 1C is an isometric view showing an example of another type of a 3D printer, namely a delta type 3D FFF printer 160. The delta printer 160 includes FFF drive motor 162, which drives filament material to a narrow hot end 164. The narrow hot end 164 can be a narrow nozzle having a generally conical shape. As shown, however, the volume that contains the hot end components need not be a cone. In this case, a faceted cone has been used. Other types of volumes can also be used, as well as different types of hot ends with differently shaped nozzles, depending on the specific 3D printing application. Further, as shown, a carriage 166 that holds the hot end 164 can also be contained within the volume defined by the total included angle with respect to the target nozzle point. This can facilitate further "plunge" capability in the delta 3D printer 160 when printing an object on, for example, a round build platform 168. In other implementations, such narrow angle hot ends are not used.

Additionally, the delta 3D printer 160 includes a motion system, which includes a controller 170, a rail motor assembly 172, a rail cart 174, and arms 176. The controller 170 can be computer hardware programmed with software, or dedicated circuitry, such as an ASIC (application specific integrated circuit), that performs 3D printing in accordance with the systems and techniques described in this specification. Note that other parts of the motion system can be included within the defined volume of the hot end 164, including mechanical structures that move the hot end and/or its carriage and mechanical structures that feed FFF material (e.g., FFF drive motor 162 can be included on the carriage 166 and be within the defined volume).

Referring again to FIGS. 1A and 1C, the build platforms used in 3D printer applications can include a plurality of openings 110. The plurality of openings 110 can be defined in the build platform 108, for example, to help provide mechanical coupling between the build platform 108 and a 3D object being built thereon. In this way, both the tensile as well as shear strength of the attachment between the object from the platform during the build can be increased.

Figure 2:
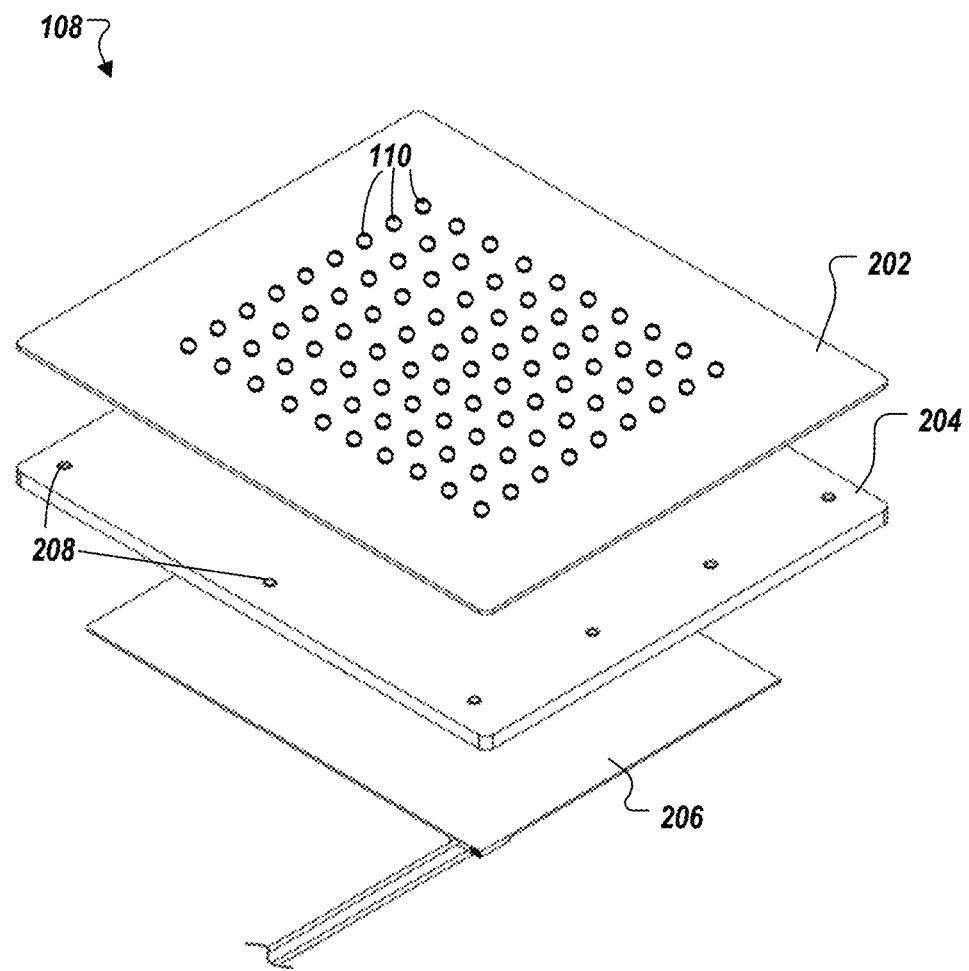
FIG. 2 is an exploded isometric view showing an example of a build platform.

Referring further to FIG. 2, an exploded view of the build platform 108 of FIG. 1A is shown. The build platform 108 includes a first plate 202 and a second plate 204 that is positioned vertically below the first plate 202. The second plate 204 is separated from the first plate 202 via, for example, spacers 208 such that a gap is defined between the two plates. In some cases, the spacers 208 can be washer-like shims that help maintain a precise gap between the first and second plates 202, 204. To adjust the size of the gap between the two plates, spacers 208 having different thicknesses can be used. Alternatively, or additionally, two or more spacers 208 can be stacked to increase the size of the gap.

In some cases, in order to promote thermal insulation between the first plate 202 and the second plate 204, the spacers 208 can be made from thermally non-conductive materials. For example, the spacers 208 can be ceramic. In some cases, the spacers 208 can be made from mica, fabric, or other materials with low thermal conductivity. Thus, transfer of heat from the second plate 204 to the first plate 202 can be minimized.

Alternatively, or additionally, transfer of heat from the second plate 204 to the first plate 202 can be minimized by minimizing the path of conduction therebetween, that is, minimizing the amount of physical connection between the two plates. For example, the contact surface between the plates and the spacers 208 may be minimized (e.g. by reducing the diameter of the spacers 208).

In some implementations, structural features other than the spacers 208 can be used to achieve spacing between the first and second plates 202, 204. For example, protrusions and/or depressions formed on the inner surface of one or both of the first and second plates 202, 204 be used to create the gap between the plates. In some cases, fasteners used to connect the first and second plates 202, 204 to each other can include a spacing mechanism to maintain separation between the plates.

In some implementations, a plurality of gaps can be defined between the first plate 202 and the second plate 204. For example, multiple, discrete gaps may be defined between the first and second plates 202, 204. Such separated gaps may or may not allow fluidic connection between them. In some cases, a gap may be defined locally for each opening or a partial group of openings in the first plate 202. In other cases, a single, fluidically connected gap may be provided for all openings in the first plate 202.

A heating element 206 is provided with the second plate 204 and can be used to heat the second plate 204. The heating element 206 can include a ceramic heater, a coil heater, or the like. In some cases, the heating element 206 can be made from materials including, but not limited to, Kanthal, nichrome, cupronickel, molybdenum, disilicide, PTC ceramic, PTC rubber, etc. In some implementations, rapid heating of the second plate 204 may be desirable. For example, the second plate 204 may be heated to reach a desired temperature in one second or less.

In some implementations, the heating element 206 can be attached to a bottom surface of the second plate 204 using, for example, an adhesive. In some cases, the heating element 206 can be clamped, welded, or bonded to the second plate 204. Alternatively, or additionally, the heating element 206 can be integrated into the second plate 204. In some cases, multiple heating elements may be provided to the second plate 204 to promote, for instance, uniform temperature distribution across the second plate 204. In some cases, the heating element 206 can heat the second plate 204 via convection, for example in cases where there is little to no direct contact between the heating element and the second plate.

The second plate 204 can be made from a material that as high thermal conductivity, such as aluminum. Other thermally conductive materials, such as copper and silver just to name a few, can also be used either alone or in combination with other materials. As such, the second plate 204 can be heated and cooled relatively quickly.

The first plate 202 can be made from same or similar materials as the second plate 204. For example, the first plate 202 can also be made from aluminum. Making one or both of the plates 202, 204 from aluminum can be advantageous since the extruded material, such as polyactic acid (PLA), may not stick well to aluminum, thus being useful during the object removal process. In some cases, the first plate 202 can be made from materials having a lower thermal conductivity relative to the second plate 204. For example, the first plate 202 can be made from steel or titanium, among others. In some cases, the first plate 202 and/or the second plate 204 can include non-metallic materials, such as ceramic, glass, FR-4 glass epoxy, and high temperature plastics, just to name a few. In some cases, the first plate 202 can have a shape and/or aspect ratio that allows the first plate 202 to have a lower thermal conductivity than the second plate 204 even when the two plates are made from the same material. Just as one example, the first plate 202 may achieve reduced thermal conductivity by having a higher porosity than the second plate 204.

Because the first plate 202 is separated from the second plate 204 by a gap, indirect heating of the first plate 202 due to the heating element 206, which is provided to the second plate 204, may be minimized. And as noted above, use of spacers 208 that are thermally insulating can further prevent unwanted heat from reaching the first plate 202.

In some cases, the first plate 202 can include a heat sink as well as other passive or active cooling systems in order to keep the first plate 202 at a lower temperature than the second plate 204. This can help, for example, minimize heat transfer to the 3D object built on the first plate 202. In some cases, the second plate 204 can also include similar cooling systems in order to promote faster cooling after the end of a heating cycle.

As mentioned above, the plurality of openings 110 can help provide mechanical coupling between a platform and an object being built on said platform. Specifically, the material being extruded from the nozzle can be injected one at a time into one or more of the plurality of openings 110 that are defined in the first plate 202. As the extruded material, which can include PLA and the like, flows into the opening, a rivet-like structure can be formed that helps anchor the object being built on the first plate 202.

Figure 3A:
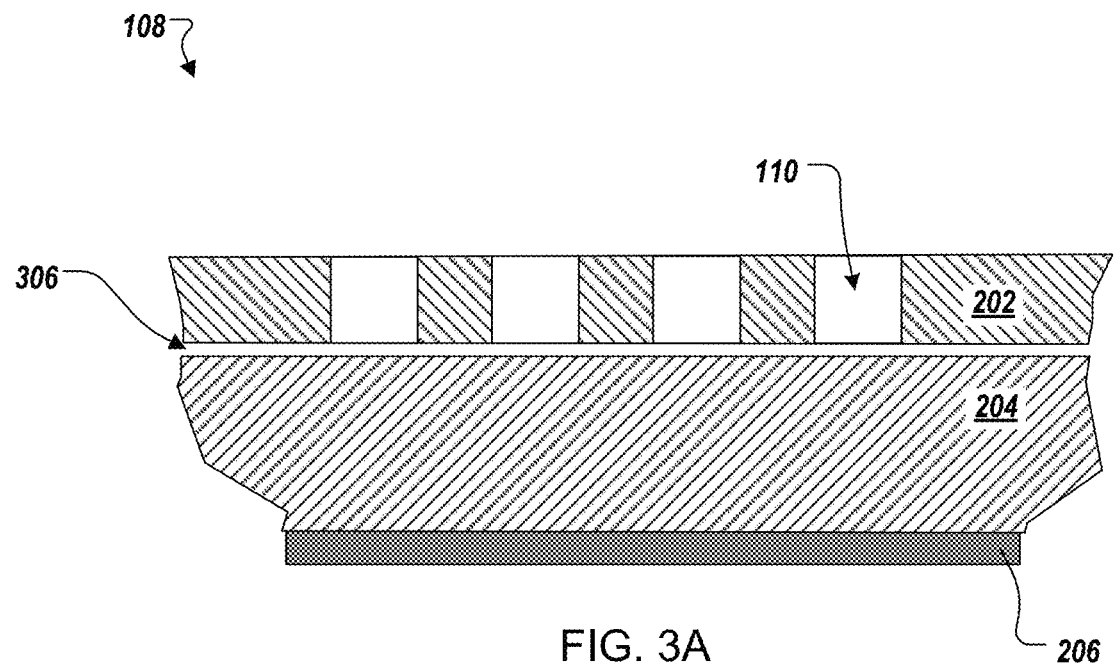
FIG. 3A-3D are cross-sectional schematic drawings showing an example of a process for creating a 3D object using rivets.
Figure 3B:
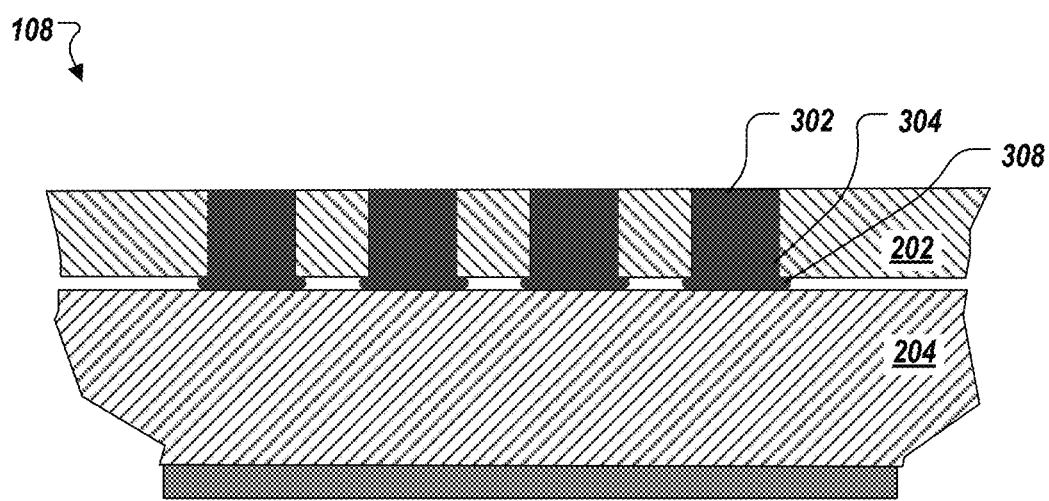

In more detail, referring further to FIGS. 3A and 3B, the rivet-like structure, hereinafter referred to as a rivet 302, can be formed when the extruded material flows through the opening 110 to form a shaft portion 304. As extruded material continues to flow into the opening 110, a portion of the shaft portion 304 expands within a gap 306, which is defined between the first plate 202 and the second plate 204, to form a head portion 308. In some cases, the second plate 204 can be heated during the rivet forming step to help facilitate the formation of the head portion 308 within the gap 306. Because the head portion 308 expands to a diameter larger than that of the opening 110, the rivet 302 can be secured within the opening 110.

In some implementations, all of the openings 110 that are positioned immediately below the 3D object to be built on the first plate 202 can be filled with rivets 302 using the process described above. Alternatively, only a select number of the openings 110 positioned below the 3D object to be built may be filled with rivets 302. Under this alternative scenario, the controller can determine, either automatically or based on user input, which of the openings 110 should be filled, for example, based on the 3D shape of the object, the footprint of the object, and/or properties of the extruded material, among other parameters. The number and position of rivets 302 required to provide the desired mechanical coupling between the object and the build platform 108 may be determined experimentally. In some cases, only the openings 110 that are positioned immediately below a perimeter of the 3D object may be filled with rivets.

Figure 3C:
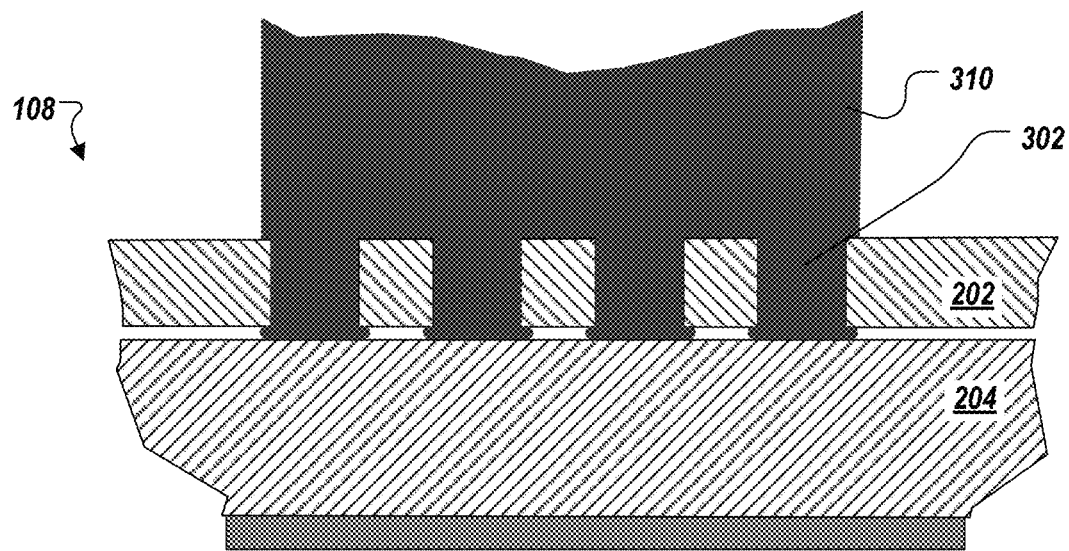
Figure 3D:
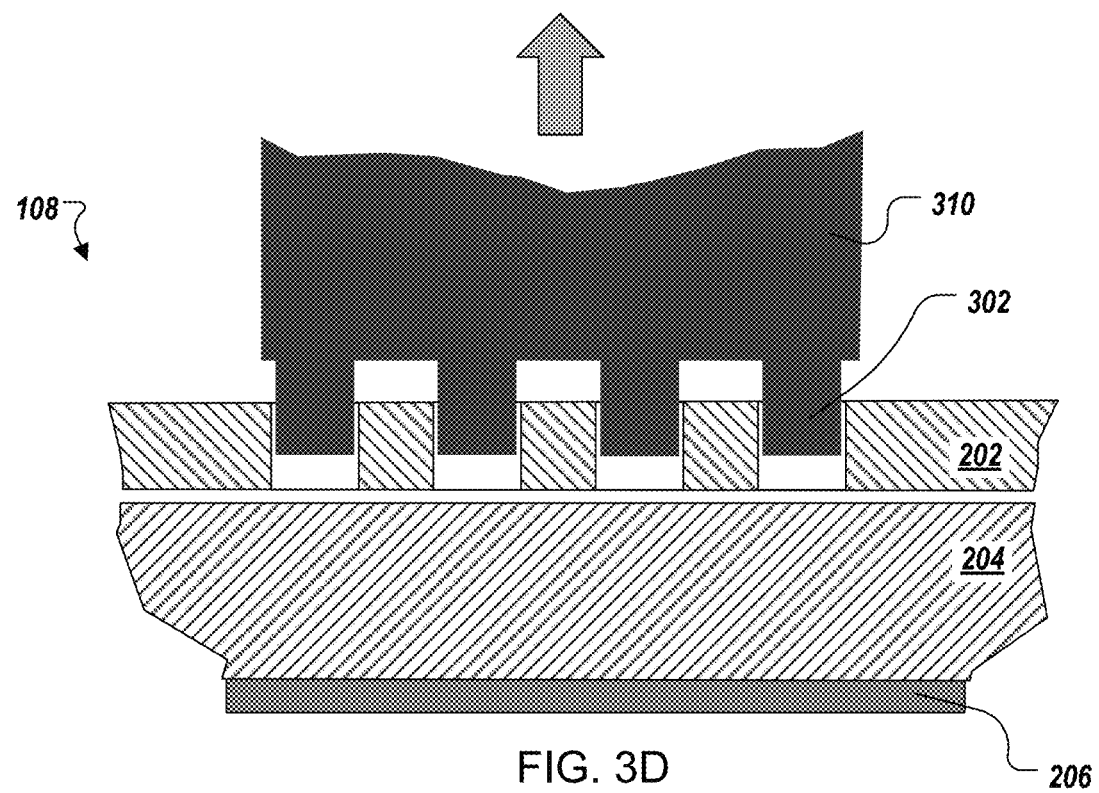

An example of a process for building a 3D object 310 on top of the rivets 302 is shown in FIGS. 3C and 3D. Referring to FIG. 3C, extruded material is deposited on the first plate 202 to form the object 310. The lower surface of the object 310 that correspond to locations of filled openings 110 fuse with the rivets 302 to create a mechanical coupling to the build platform 108. As such, relative movement between the object 310 and the build platform 108 can be prevented or mitigated. That is, even when the build platform 108 is rapidly moved along the x/y/z-axes and/or tilted with respect to the horizontal plane, the object 310 may remain securely coupled to the build platform 108.

Referring now to FIG. 3D, an example of a process for removing the completed 3D object 310 from the build platform 108 is shown. Specifically, upon completion of the 3D object 310, the heating element 206 can be activated to heat the second plate 204. Here, the second plate 204 can be heated to a target threshold temperature at which just the rivet portion 302 becomes softened while the structural integrity of the object 310 remains intact. For example, when PLA is used as the extruded material, the heating element 206 can be activated to heat the second plate 204 to a temperature of around 85° C. In some cases, rapidly heating the second plate 204 can help minimize unwanted heating of the object 310. For example, the second plate 204 can be heated at 25° C./sec., 50° C./sec., or higher.

Once the rivets 302 are sufficiently heated and softened, the object 310 can be pulled away from the first plate 202 either by hand or machine. During this process, the softened rivets 302, in particular the head portions 308, are plastically deformed so as to allow each rivet 302 to be pulled out of the opening 110. Because the first plate 202 can be thermally isolated from the second plate 204, through platform design and material selection as well as rapid heating of the second plate 204, the head portion 308 can be softened, and thus made deformable, without otherwise affecting the structural integrity of the object 310 or other portions of the rivet 302. Once the object 310 has been pulled off from the build platform 108, portions of the rivet 302 that remain attached to the underside of the object 310 can be removed by hand or a cutting tool. Moreover, in some implementations, rather than 3D printing the object 310 directly on the rivets 302, a raft technique (e.g., as described in U.S. Patent Publication No. 2014/0371895, which is hereby incorporated by reference) can be used, where a raft is printed on the rivets 302, and the part 310 is printed on the raft, such as is described in further detail below.

Figure 4:
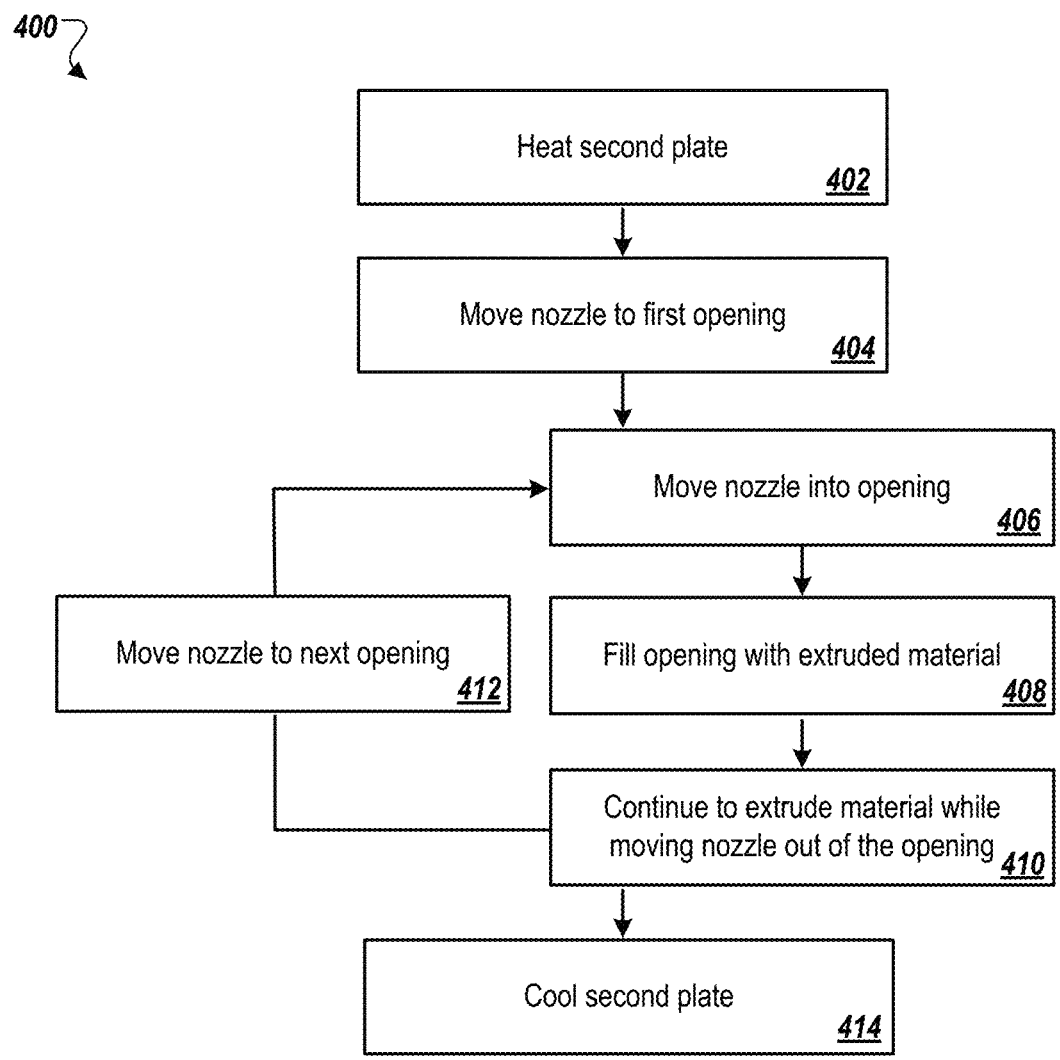
FIG. 4 is a block diagram showing an example of a rivet formation process.

Referring further to FIG. 4, an example of a process flow 400 for forming the rivets 302 is shown. In step 402, the second plate 204 can be heated to a rivet formation, or activation, temperature of, for example, around 45° C. Heating the second plate 204 during rivet formation can help facilitate the formation of the head portion 308 by allowing it to expand outward within the gap 306. In step 404, the nozzle is moved and centered with respect to the first opening in which the rivet 302 is to be formed.

In step 406, the nozzle can be dipped into the opening. In step 408, the opening can be filled with the extruded material to form the rivet 302. For example, around 80% to 90% of the hole volume can be filled with the extruded material. In order to form the head portion 308 that expands into the gap 306, an extra 20% to 30% (of the hole volume) of the extruded material, for example, can be further injected into the opening.

In step 410, the nozzle can be moved out of the opening while continuing to extrude the filament material. In some cases, a spiral extrusion method may be employed. By spiral extruding, for example, the volume of the opening may be filled more thoroughly and evenly by extruding along a helical path. Other extrusion techniques based on different movement patterns may be used to help spread and distribute the extruded filament within the opening more evenly.

Once the first rivet has been formed, in step 412, the nozzle can be moved to the next opening where the next rivet is to be formed. Steps 406-412 can be repeated until all of the desired rivets have been created.

In some implementations, in step 412, the nozzle can continue to extrude material on the build platform 108 as it is repositioned to the next opening such that each new rivet is connected to an immediately preceding rivet. The material that is extruded in this manner may be part of the 3D object, or may be part of a base on top of which the 3D object will later be built.

In some cases, all the rivets may be formed first without being connected to each other. In this case, subsequently building the object on top of the rivets can connect them. In some implementations, the rivets may extend farther vertically above the surface of the build platform 108 such that a bridging technique can be used to print the 3D object on top of the rivets without actually making contact with the platform 108.

In step 414, once all the rivets have been made, the second plate 204 can be cooled back to below the rivet formation temperature of around 45° C. For example, the second plate 204 can be cooled to room temperature.

In some implementations, the rivets 302 may be formed together with the object 310. That is, instead of first forming all the rivets 302, as illustrated in FIGS. 3A-3D, the rivet forming process can be performed one at a time during the 3D object formation process. For example, when the nozzle, while extruding material for the 3D object, becomes positioned immediately above one of the openings 110, a rivet forming procedure may be performed. Once the rivet has been formed, the nozzle can revert back to extruding material for the 3D object. This process of interrupting object formation to create rivets may be performed each time the nozzle becomes positioned immediately above one of the openings 110 (or selected ones of the openings 110) during the 3D object formation process.

Figure 5:
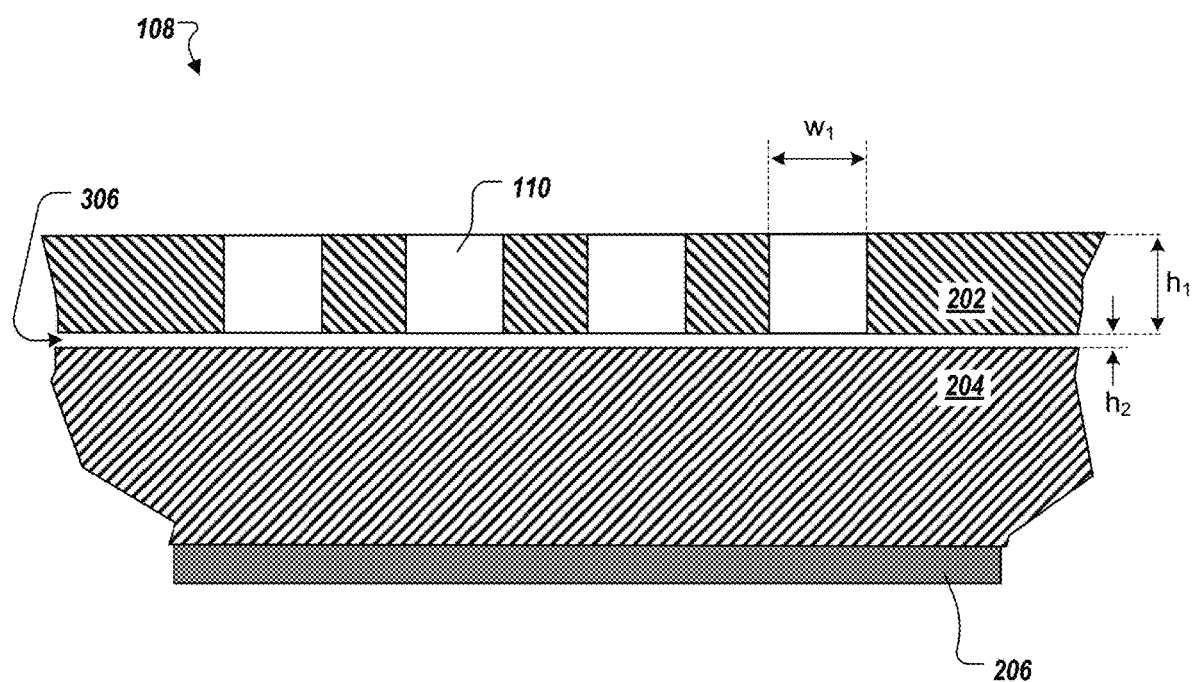
FIG. 5 is a cross-sectional view of the example of a build platform of FIG. 2.

A schematic drawing of the build platform 108 is shown in FIG. 5. Each of the openings 110, which can be circular in shape, can have a width $W_1$ of approximately 0.06 inches. In some cases, the openings 110 may have a tapered cross-section in which the width $W_1$ decreases as it approaches the gap 306. Other shapes or sizes may also be used depending on extrusion conditions. The openings 110 can be arranged in a geometric pattern across the first plate 202. The required quantity and positions of openings 110 can be determined experimentally and may vary depending on extrusion conditions.

Sizes of the openings 110 may be varied depending on the specific material extruded and/or aperture size of the extruder. That is, larger apertures may require larger openings. For example, the width $W_1$ of each opening 110 may range from around 0.005 inches for small aperture sizes and up to 5 inches in diameter for very large aperture sizes. Similarly, shapes of the openings 110 may be varied depending on specific extrusion conditions, but openings having rounded features may be preferred.

As for the quantity and positions of openings 110, which as noted above may depend on specific extrusion conditions, the first plate 202 can have as few as one opening or up to tens of thousands. Some plates may be designed for specific prints used in manufacturing and, therefore, may contain only holes in strategic locations to benefit those specific prints.

The height of each opening 110 corresponds to the thickness $h_1$ of the first plate 202 and can be approximately 0.06 inches. The gap 306 can have a thickness $h_2$ of approximately 0.01 inches. Thicknesses $h_1$ and $h_2$, of course, may be varied depending on specific extrusion conditions to be used.

For example, extruders with larger apertures may require gaps with larger thickness $h_2$, for example up to 1 inch or more. Conversely, extruders with smaller apertures, such as in 3D printers for nano-scaled printing applications, may require gaps with smaller thickness $h_2$.

Figure 6A:
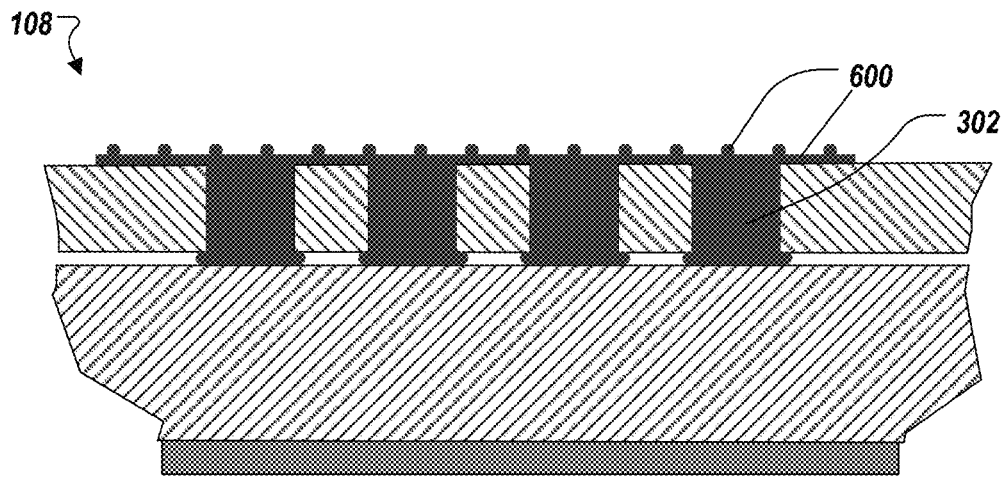
FIGS. 6A-6C are cross-sectional schematic drawings showing an example of a process for creating a 3D object on top of a raft.
Figure 6B:
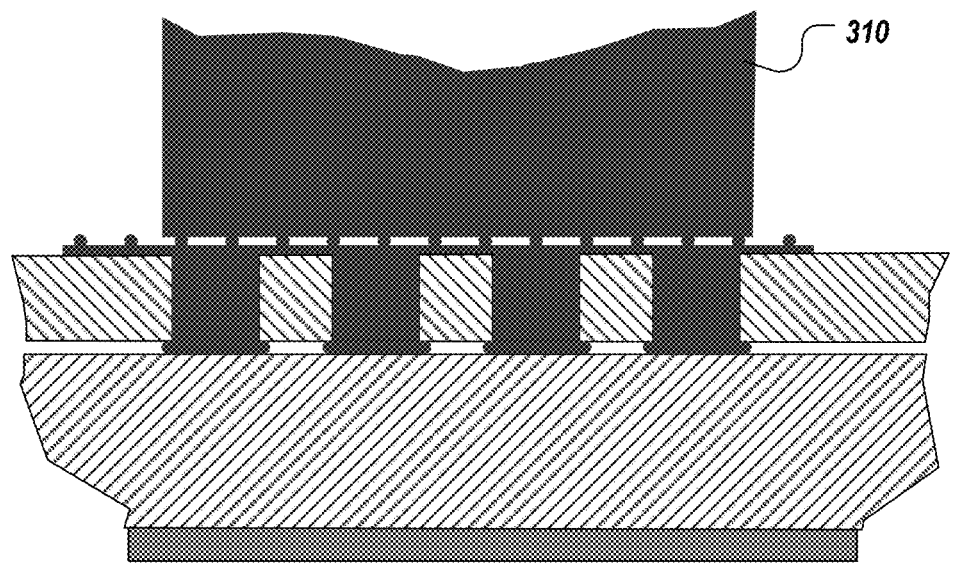
Figure 6C:
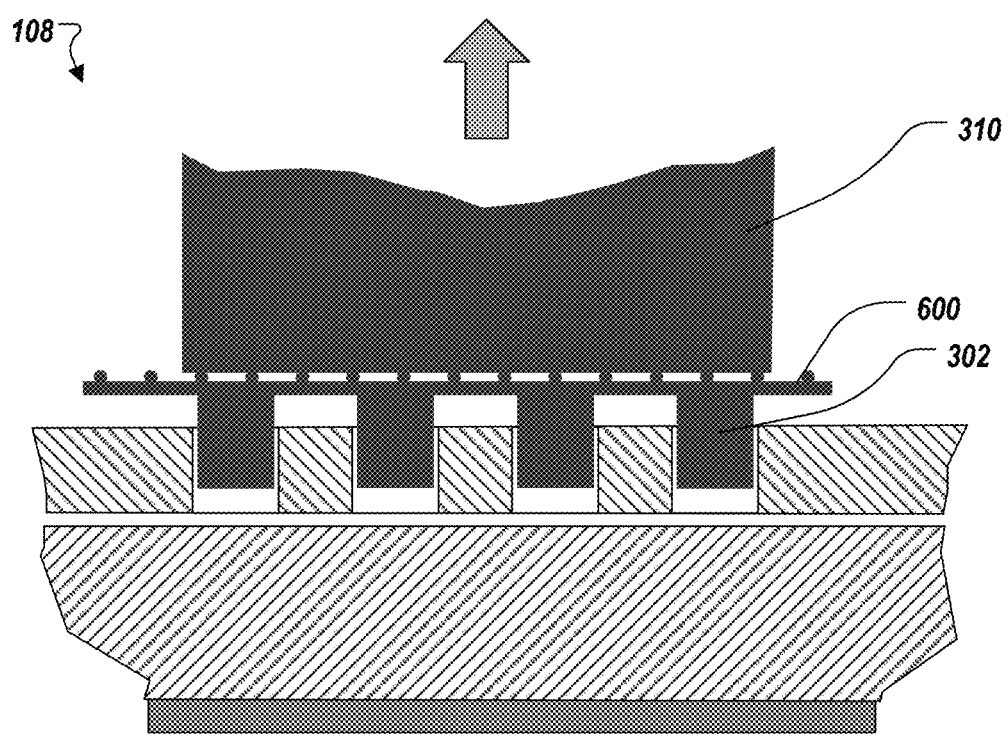

Referring now to FIGS. 6A, 6B, and 6C, an example process of forming an object on top of a raft is shown. Specifically, after the rivets 302 have been formed in the desired openings 110, as shown in FIG. 3B, a raft 600 can be formed on top of the rivets 302. Here, the raft 600 refers to a structural support layer that is disposed between the rivets 302 and the object 310. The raft 600 can be formed using the same extrusion process used to form the rivets 302 and the object 310. For example, after the rivets 302 have been formed, the extruder can deposit one or more planar layers on top of the rivets 302 to form the raft 600. Subsequently, the object 310 can be formed on top of the raft 600, essentially using the raft 600 as a build platform. After softening the rivets 302 and pulling out the object 310 along with the raft 600 and the rivets 302, as shown in FIG. 6C, the object 310 can be removed by hand from the raft 600 or cut off using a tool.

Implementations of the subject matter described in this specification can be implemented in combination with digital electronic circuitry, or computer software, firmware, or hardware. Implementations of the subject matter described in this specification can be implemented in an additive manufacturing system that uses one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many implementation details, these should not be construed as limitations on the scope of the invention or of what may be claimed, but rather as descriptions of features specific to particular embodiments of the invention. For example, while additive manufacturing techniques were used in the illustrative examples to form the 3D object, subtractive machining operations and/or pick and place operations may further be used.

Moreover, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the invention have been described. Other embodiments are within the scope of the following claims. In addition, the actions recited in the claims can be performed in a different order and still achieve desirable results.

What is claimed is:

1. A non-transitory computer-readable medium storing instructions that cause one or more computers to perform operations when executed by the one or more computers for controlling a 3D printer, the 3D printer comprising a build platform, the build platform including a first plate on which a 3D object is formed and a second plate that is positioned vertically below and separated from the first plate such that a gap is defined between the first and second plates, and an extruder for one or more deposition materials, the extruder including at least one nozzle that is movable relative to the build platform, the operations comprising:
    causing at least some of the extruded material to flow through one or more openings that are defined in the first plate into the gap to thereby form one or more rivets with a head portion that expands within the gap to couple the 3D object to the first plate;
    causing material to be extruded out of the nozzle while controlling the relative movement between the build platform and the nozzle to thereby form the 3D object above the one or more rivets; and
    heating the second plate to a threshold temperature, while keeping the first plate below the threshold temperature, to heat and soften the one or more rivets relative to the 3D object to thereby allow removal of the coupling between the 3D object and the first plate,
    wherein keeping the first plate below the threshold temperature includes cooling the first plate.

2. The medium of claim 1, wherein the operations further include heating, during rivet formation, the second plate to an activation temperature that is lower than the threshold temperature.

3. The medium of claim 1, wherein the operations further include causing material to be extruded out of the nozzle while controlling the relative movement between the build platform and the nozzle to thereby form a raft on which the 3D object is to be built, the raft being attached to the one or more rivets.

4. The medium of claim 1, wherein forming the one or more rivets includes filling all of the one or more openings that are positioned beneath the 3D object to be formed.

5. The medium of claim 1, wherein forming the one or more rivets includes filling a select number of the one or more openings that are positioned beneath the 3D object to be formed.

6. The medium of claim 5, wherein filling the select number of the one or more openings includes filling only the one or more openings that are positioned beneath a perimeter of the 3D object to be formed.

7. The medium of claim 1, wherein forming the one or more rivets includes dipping the nozzle into the one or more openings into which the extruded material is to flow.

8. The medium of claim 7, wherein forming the one or more rivets further includes extruding the material while moving the nozzle out of the one or more openings in a helical path.

9. The medium of claim 1, wherein forming the one or more rivets further includes causing the head portion to expand within the gap between the first and second plates that has a height of between 0.01 and 1 inch.

10. The medium of claim 1, wherein heating the second plate to the threshold temperature includes heating the second plate at a rate of 25° C./sec. or higher.

11. The medium of claim 1, wherein heating the second plate to the threshold temperature includes heating the second plate at a rate of 50° C./sec. or higher.

* * * * *